(12) United States Patent
Yoon et al.

(10) Patent No.: US 9,538,226 B2
(45) Date of Patent: Jan. 3, 2017

(54) METHOD FOR OPERATING MOVING PICTURES AND ELECTRONIC DEVICE THEREOF

(71) Applicant: Samsung Electronics Co., Ltd., Gyeonggi-do (KR)

(72) Inventors: Pil-Joo Yoon, Gyeonggi-do (KR); Doo-Suk Kang, Gyeonggi-do (KR); Geon-Soo Kim, Gyeonggi-do (KR); Dong-Hyun Yeom, Gyeonggi-do (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 14/562,120

(22) Filed: Dec. 5, 2014

(65) Prior Publication Data
US 2015/0163415 A1   Jun. 11, 2015

(30) Foreign Application Priority Data

Dec. 6, 2013 (KR) .......................... 10-2013-015464

(51) Int. Cl.
| | |
|---|---|
| *G11B 27/00* | (2006.01) |
| *H04N 21/2743* | (2011.01) |
| *G11B 27/036* | (2006.01) |
| *H04N 21/472* | (2011.01) |
| *H04N 5/232* | (2006.01) |
| *H04N 5/247* | (2006.01) |
| *H04N 5/272* | (2006.01) |

(52) U.S. Cl.
CPC ......... *H04N 21/2743* (2013.01); *G11B 27/036* (2013.01); *H04N 5/23206* (2013.01); *H04N 5/247* (2013.01); *H04N 5/272* (2013.01); *H04N 21/47205* (2013.01)

(58) Field of Classification Search
CPC ... G11B 27/034; G11B 2220/90; G11B 27/34; G11B 27/105; H04N 9/8042
USPC ......................................................... 386/278
See application file for complete search history.

(56) References Cited

U.S. PATENT DOCUMENTS

2008/0118220 A1* 5/2008 Park ....................... H04N 5/772
 386/333
2014/0096167 A1* 4/2014 Lang .................. H04N 21/4788
 725/91

FOREIGN PATENT DOCUMENTS

| JP | 2011-077758 | 4/2011 |
|---|---|---|
| KR | 10-2008-0044131 | 5/2008 |
| KR | 10-2011-0099590 | 9/2011 |

* cited by examiner

*Primary Examiner* — William C Vaughn, Jr.
*Assistant Examiner* — Daniel Tekle

(57) ABSTRACT

A method of operating an electronic device is provided. The method of operating an electronic device includes generating at least one second moving picture representing a reaction to a first moving picture of a user of the electronic device based on a visual point of the first moving picture using an image sensor included in the electronic device while playing the first moving picture captured or received from a server. The method also includes generating a third moving picture in which at least a portion of the second moving picture is coupled to a partial area of the first moving picture at a corresponding visual point of the first moving picture.

19 Claims, 19 Drawing Sheets

METHOD FOR OPERATING MOVING PICTURES AND ELECTRONIC DEVICE THEREOF

PRIORITY

The present application is related to and claims priority under 35 U.S.C. §119(a) of a Korean Patent Application filed in the Korean Intellectual Property Office on Dec. 6, 2013 and assigned Serial No. 10-2013-0151464, the entire disclosure of which is hereby incorporated by reference.

TECHNICAL FIELD

The present disclosure relates to a method of operating moving pictures and an electronic device thereof.

BACKGROUND

Nowadays, as multimedia technology develops, electronic devices having various functions are available. Such electronic devices generally have a convergence function that complexly performs at least one function.

Moreover, as the electronic device, a mobile terminal that may be classified into a so-called 'smart phone' is generally used. Particularly, such a mobile terminal has a display module of a large screen touch method and has a high pixel camera module in addition to a basic function of communication with another party and may thus photograph a still picture and a moving picture. Further, the mobile terminal may reproduce multimedia contents such as music and a moving picture and perform web surfing by connecting to a network.

For example, an electronic device user may upload multimedia contents such as a picture, a moving picture, and an e-book through a web server such as YouTube or may receive contents in a streaming form from a web server. Further, the user may provide feedback with a method of inputting an epilogue of corresponding contents in a comment form or a method of selecting a separate recommendation icon.

However, as described above, a method of representing feedback is limited. Accordingly, it is necessary that the electronic device provides a service that provides a user reaction with various methods. Further, an electronic device user has a desire wanting to search for different moving pictures captured with different angles at the same location (such as a concert hall), but a service that satisfies such a desire does not exist.

SUMMARY

To address the above-discussed deficiencies, it is a primary object to provide a method of operating moving pictures and an electronic device thereof for a streaming service of the electronic device.

In a first example, a method of operating moving pictures is provided. for the method includes searching for a moving picture having a correlation in the electronic device.

In a second example, an electronic device is provided for operating moving pictures. The electronic device is configured to search for a moving picture having a correlation.

In a third example, an electronic device is provided. The electronic device includes a user interface configured to intuitionally share a user reaction to contents.

In a fourth example, a method of operating an electronic device is provided. The method includes generating at least one second moving picture representing a reaction to a first moving picture of a user of the electronic device based on a visual point of the first moving picture using an image sensor included in the electronic device while reproducing the first moving picture captured or received from a server. The method also includes generating a third moving picture in which a portion of or the entire second moving picture is coupled to a partial area of the first moving picture at a corresponding visual point of the first moving picture.

In a fifth example, a method of operating an electronic device is provided. The method includes receiving a first moving picture from a server. The method also includes receiving first information related to the first moving picture from the server. The method further includes reproducing a partial segment of the first moving picture based on the first information.

In a sixth example, a method of operating an electronic device is provided. The method includes capturing a first moving picture of a target. The method also includes receiving, by a second electronic device, a second moving picture that captures the target from the second electronic device. The method also includes generating a third moving picture in which the first moving picture and the second moving picture are coupled to correspond to synchronization of a recording time point.

In a seventh example, an electronic device is provided. The electronic device includes at least one image sensor. The electronic device also includes a memory. The electronic device further includes at least one processor. The processor is configured to generate at least one second moving picture representing a reaction to a first moving picture of a user of the electronic device based on a visual point of the first moving picture using the image sensor while reproducing a first moving picture captured or received from a server. The processor is also configured to generate a third moving picture in which a portion or the entire of the second moving picture is coupled to a partial area of the first moving picture at a corresponding visual point of the first moving picture. The processor is further configured to reproduce the coupled third moving picture.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, embodiments of the present disclosure will be described with reference to the accompanying drawings. Detailed descriptions of well-known functions and structures incorporated herein may be omitted to avoid obscuring the subject matter of the present disclosure. The terms used herein are defined according to the functions of the present disclosure. Thus, the terms may vary depending on a user's or an operator's intension and usage. That is, the terms used herein should be understood based on the descriptions made herein.

When describing exemplary embodiments of the present disclosure, an electronic device to which a display device as a display unit is applied and including at least one image sensor is described, but the electronic device is not limited thereto. For example, the electronic device can include at least one of a smart phone, a tablet Personal Computer (PC), a mobile phone, a video phone, an e-book reader, a desktop PC, a laptop PC, a Netbook computer, a Personal Digital Assistant (PDA), a Moving Picture Experts Group layer-3 (MP3) player, electronic accessory, a camera, a wearable device, a wrist watch, a refrigerator, an air conditioner, a vacuum cleaner, an artificial intelligence robot, a television, a Digital Video disk (DVD) player, an audio device, an oven, a microwave oven, a washing machine, an electronic bracelet, an electronic necklace, an air cleaner, an electronic frame, a medical equipment, a navigation device, a Global Positioning System (GPS) receiver, an Event Data Recorder (EDR), a Flight Data Recorder (FDR), a set-top box, a television box, an electronic dictionary, a vehicle infotainment device, an electronic equipment for ship, avionics, a security device, electronic clothing, an electronic key, a camcorder, game consoles, a Head-Mounted Display (HMD), a flat panel display device, an electronic album, a portion of furniture or a building/structure including an electronic device, an electronic board, an electronic signature receiving device, and a projector including at least one image sensor.

Figure 1:
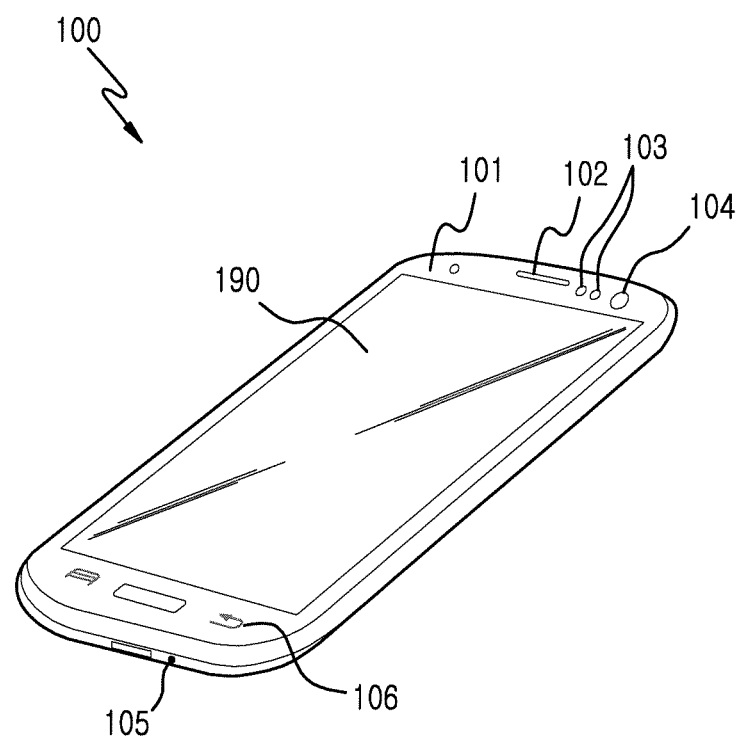
FIG. 1 is a perspective view illustrating an example electronic device according to this disclosure.

FIG. 1 is a perspective view illustrating an example electronic device 100 according to this disclosure.

Referring to FIG. 1, in the electronic device 100, at a front surface 101 thereof, a display device 190 is installed. The display device 190 displays an electrical signal received from the electronic device 100 into a text and an image such as graphic and video. Further, the display device 190 is implemented with a touch screen that can simultaneously input/output data using touch sensor technology.

In an upper portion of the display device 190, an ear piece 102 that receives a sound is installed, and at a periphery of the ear piece 102, a plurality of sensors 103, for use convenience of the electronic device 100, such as a proximity sensor or an illumination sensor and a camera module 104 that captures a subject is installed. The camera module 104 is disposed at the front surface 101 of the electronic device 100 to perform a self-camera function or is disposed at a rear surface thereof to photograph a background image.

The electronic device 100 further includes a microphone device 105 located in a lower portion of the display device 190 and that receives an input of a sound and a keypad device 106 in which key buttons are disposed. However, elements of the electronic device 100 are not limited thereto, and in the electronic device 100, various additional devices that perform known other additional functions may be further installed.

Figure 2:
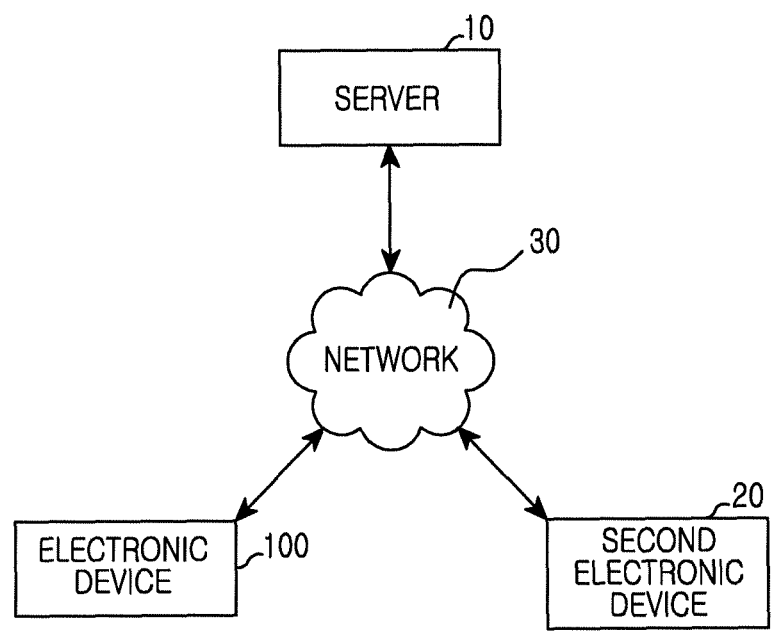
FIG. 2 is a diagram illustrating an example method of sharing a file of an electronic device according to this disclosure.

FIG. 2 is a diagram illustrating an example method of sharing a file of an electronic device 100 according to this disclosure.

Referring to FIG. 2, the electronic device 100 is connected to a server 10 or a second electronic device 20 through a predetermined network 30. By being connected to the server 10 or the second electronic device 20, the electronic device 100 transmits and receives a file to and from the server 10 and the second electronic device 20. The server 10 can include a cloud server of a cloud service method connected to the electronic device 100 by the network 30 to provide various contents or a streaming server that provides a media file, but the server 10 is not limited thereto.

The electronic device 100 is connected to the server 10 by the network 30 to upload a picture and a moving picture file to the server 10. Further, the electronic device 100 is connected to the server 10 by the network 30 to receive a picture and a moving picture file from the server 10.

The electronic device 100 photographs a second moving picture while reproducing a first moving picture received from the server 10. Further, the electronic device 100 photographs a second moving picture while reproducing the first moving picture captured through an image sensor. Such a second moving picture can include a reaction moving picture representing a reaction to the first moving picture of a user of the electronic device 100.

The electronic device 100 couples a partial of or the entire second moving picture to a partial area of the first moving picture at a corresponding visual point of the first moving picture to generate a third moving picture. For example, the third moving picture is uploaded to the server 10 through the network 30, and such a third moving picture is controlled by the server 10 to be received in the second electronic device 20 through the network 30.

The electronic device 100 shares a file with the second electronic device 20 with a Peer To Peer (P2P) method, which is a method of sharing a file by directly connecting with a one-to-one method to the second electronic device 20 instead of using the server 10. For example, the electronic device 100 can share a file with the second electronic device 20 through a service such as WiFi Direct, e-mail, Short Message Service (SMS), Near Field Communication (NFC), and Social Network Service (SNS). However, a method of sharing a file is not limited thereto and various methods in which the electronic device 100 shares a file with the second electronic device 20 exist.

The second electronic device 20 can be various devices having at least one communication module, such as various devices such as a Personal Digital Assistant (PDA), a laptop computer, a mobile phone, a smart phone, a Netbook computer, a television, a Mobile Internet Device (MID), a Ultra Mobile Personal Computer (UMPC), a tablet PC, a wrist watch, a camera device, a navigation device, and an MP3 player.

The network 30 includes a wired or wireless network and can include at least one of a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, a Near Field Communication (NFC) network, an infrared communication network, and a Bluetooth network according to a communication network.

Figure 3:
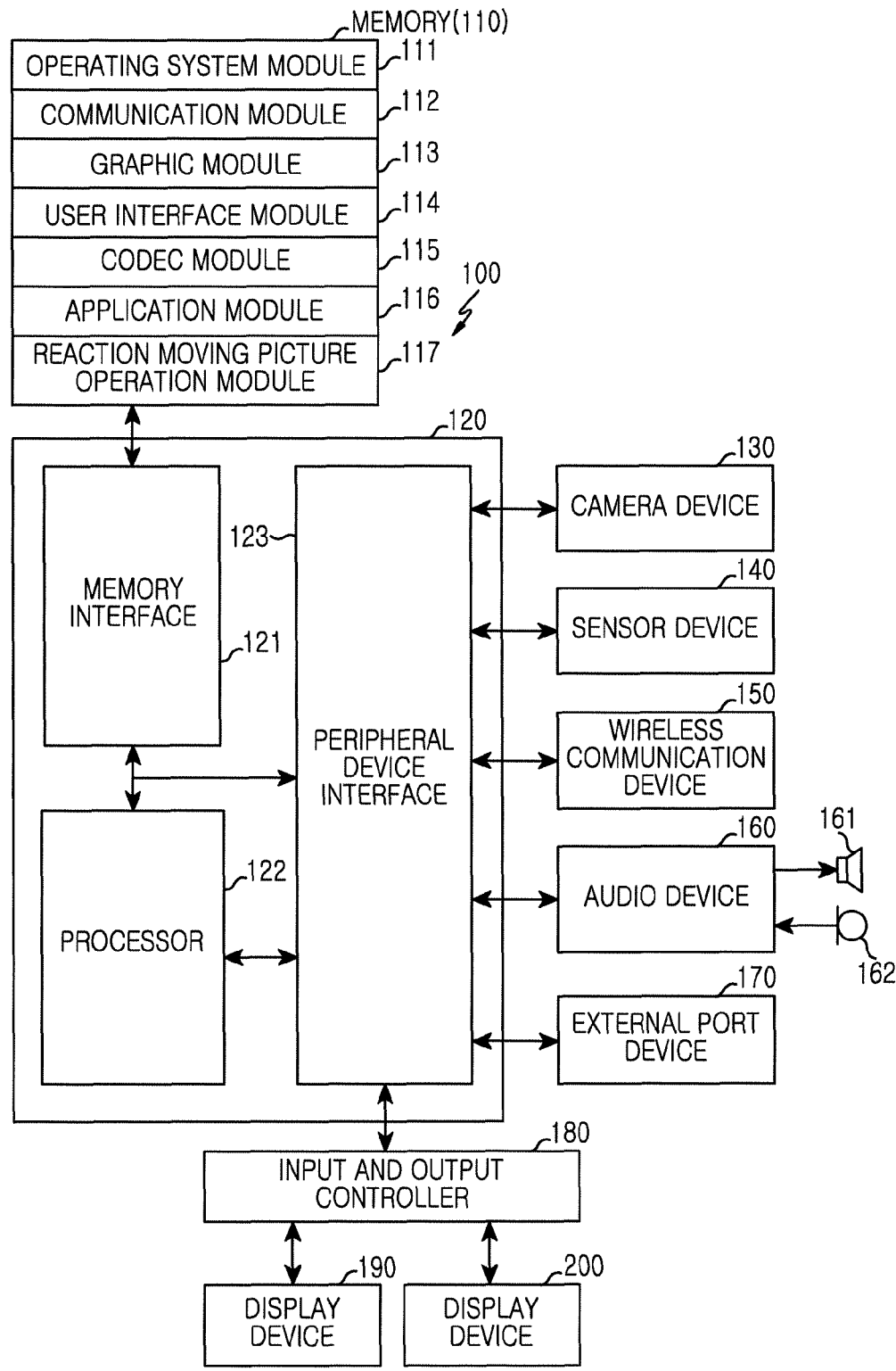
FIG. 3 is a block diagram illustrating an example configuration of an electronic device according to this disclosure.

FIG. 3 is a block diagram illustrating an example configuration of an electronic device 100 according to this disclosure.

Referring to FIG. 3, the electronic device 100 can be a device such as a PDA, a laptop computer, a mobile phone, a smart phone, a Netbook computer, a hand-held computer, an MID, a media player, a UMPC, a tablet PC, a notebook PC, a wrist watch, a navigation device, an MP3 player, a camera device, or a wearable device. Further, the electronic device 100 can be a random device including a device in which two or more functions of such devices are coupled.

The electronic device 100 includes a memory 110, a processor unit 120, a camera device 130, a sensor device 140, a wireless communication device 150, an audio device 160, an external port device 170, an input and output controller 180, a display device 190, and an input device 200. The memory 110 and the external port device 170 can be formed in plural.

Each constituent element will be described as follows.

The processor unit 120 includes a memory interface 121, at least one processor 122, and a peripheral device interface 123. Here, the memory interface 121, the at least one processor 122, and the peripheral device interface 123 included in the processor unit 120 can be integrated into at least one integrated circuit or can be implemented with a separate constituent element.

The memory interface 121 controls access of a constituent element such as the processor 122 or the peripheral device interface 123 to the memory 110.

The peripheral device interface 123 controls a connection of the memory interface 121, the processor 122, and an input and output peripheral device of the electronic device 100.

The processor 122 controls the electronic device 100 to provide various multimedia services using at least one software program. By executing at least one program stored at the memory 110, the processor 122 provides a service corresponding to the program.

By executing several software programs, the processor 122 performs several functions for the electronic device 100 and performs a processing and control for audio dedicated communication, audiovisual communication, and data communication. Further, by interlocking with software modules stored at the memory 110, the processor 122 performs a method according to this disclosure.

The processor 122 includes at least one data processor, image processor, or coder and decoder (codec). Further, the electronic device 100 can separately form a data processor, an image processor, or a codec.

The processor 122 includes at least one Application Processor (AP) or at least one Communication Processor (CP).

Various constituent elements of the electronic device 100 can be connected through at least one communication bus or an electrical connection means.

The camera device 130 performs a camera function of a picture, video clip, and recording. The camera device 130 includes a Charged Coupled Device (CCD) or a Complementary Metal-Oxide Semiconductor (CMOS). Further, the camera device 130 changes a hardware configuration, for example, adjusting a lens movement and the number of apertures according to a camera program in which the processor 122 executes.

The camera device 130 provides collected images acquired by capturing a subject to the processor unit 120. The camera device 130 includes an image sensor that converts an optical signal to an electrical signal, an image signal processor that converts an analog image signal to a digital image signal, and a digital signal processor that performs an image processing so as to display an image signal output from the image signal processor in the display device 190. The camera device 130 can include an actuator that moves a lens and a driver Integrated Circuit (IC) that drives the actuator.

The sensor device 140 can include a proximity sensor, a hall sensor, an illumination sensor, and a motion sensor. For example, the proximity sensor detects an object approaching the electronic device 100, and the hall sensor detects a magnetic force of a metal body. Further, the illumination sensor detects light of a periphery of the electronic device 100, and the motion sensor includes an acceleration sensor or a gyro sensor that detects a motion of the electronic device 100. However, the sensor device 140 is not limited thereto and can include various sensors that perform other known or additional functions.

The wireless communication device 150 enables wireless communication and includes a radio frequency transmitter and receiver or a light (such as infrared rays) transmitter and receiver. The wireless communication device 150 can include a Radio Frequency Integrated Circuit unit (RF IC unit) and a base band processor. The RF IC unit transmits and receives electromagnetic waves, converts a base band signal from the base band processor to electromagnetic waves, and transmits the electromagnetic waves through an antenna.

The RF IC unit includes an RF transceiver, an amplifier, a tuner, an oscillator, a digital signal processor, a codec chip set, and a Subscriber Identity Module (SIM) card.

The wireless communication device 150 operates through at least one of a GSM network, an EDGE network, a CDMA network, a W-CDMA network, an LTE network, an OFDMA network, a Wi-Fi network, a WiMax network, an NFC network, an Infrared ray communication network, and a Bluetooth network according to a communication network. However, the wireless communication device 150 is not limited thereto and can use several communication methods through a protocol for an e-mail, instant messaging, or an SMS.

The audio device 160 is connected to a speaker 161 and a microphone 162 to perform an audio input and output function such as a speech recognition, voice duplication, digital recording, or communication function. The audio device 160 provides an audio interface between a user and the electronic device 100, converts a data signal received from the processor 122 to an electric signal, and outputs the converted electric signal through the speaker 161.

The speaker 161 converts and outputs an electric signal to an audible frequency band and is disposed at the front side or the rear side of the electronic device 100. The speaker 161 includes a flexible film speaker in which at least one piezoelectric body is attached to a vibration film.

The microphone 162 converts a sound wave transferred from a person or other sound sources to an electric signal. The audio device 160 receives an electric signal from the microphone 162, converts the received electric signal to an audio data signal, and transfers the converted audio data signal to the processor 122. The audio device 160 can include an earphone, an ear set, a headphone, or a head set that can be detachably provided in the electronic device 100.

The external port device 170 directly connects the electronic device 100 to another electronic device or indirectly connects the electronic device 100 to another electronic device through a network (such as Internet, Intranet, or wireless Local area network (LAN)). The external port device 170 can include a Universal Serial Bus (USB) port or a FIREWIRE port.

The input and output controller 180 provides an interface between the peripheral device interface 123 and an input and output device such as the display device 190 and the input device 200. The input and output controller 180 includes a display device controller and other input device controllers.

The display device 190 provides an input and output interface between the electronic device 100 and a user. The display device 190 transfers user touch information to the processor 122 using touch detection technology and shows visual information, text, graphic, or video provided from the processor 122 to the user.

The display device 190 displays state information of the electronic device 100, a moving picture, a still picture, and a character in which the user inputs. Further, the display device 190 displays application related information driven by the processor 122. Such a display device 190 uses at least one of a Liquid Crystal Display (LCD), an Organic Light Emitting Diode (OLED), an Active Matrix Organic Light Emitting Diode (AMOLED), a Thin Film Transistor-Liquid Crystal Display (TFT-LCD), a flexible display, and a three-dimensional (3D) display.

The input device 200 provides input data generated by a user selection to the processor 122 through the input and output controller 180. The input device 200 includes a keypad including at least one hardware button and a touch pad that detects touch information.

The input device 200 includes an up/down button for a volume control and further includes at least one of pointer devices such as a push button, a locker button, a locker switch, a thumb-wheel, a dial, a stick, a mouse, a track-ball, or a stylus in which a corresponding function is given.

The memory 110 includes a non-volatile memory or a high speed Random Access Memory (RAM) such as at least one magnetic disk storage device, at least one light storage device, or a flash memory (such as NAND, NOR).

The memory 110 stores software, and such software includes an operating system module 111, a communication module 112, a graphic module 113, a user interface module 114, a codec module 115, an application module 116, and a reaction moving picture operation module 117. A term of a module can be represented with a set of instructions, an instruction set, or a program.

The operating system module 111 can include a built-in operation system such as WINDOWS, LINUX, Darwin, RTXC, UNIX, OS X, Android or VxWorks and include several software components that control a general system operation. A control of such a general system operation can include memory control and management, storage hardware (device) control and management, and power control and management. Further, the operating system module 111 can perform a function of enabling to smoothly perform communication between several hardware (device) and software components (module).

The communication module 112 performs communication with another electronic device such as a computer, the server 10, and an electronic device through the wireless communication device 150 or the external port device 170.

The graphic module 113 includes several software components for providing and displaying graphic to the display device 190. A term of graphic indicates a text, a web page, an icon, a digital image, video, and animation.

The user interface module 114 includes several software components related to a user interface. The user interface module 114 controls the display device 190 to display application related information driven by the processor 122. Further, the user interface module 114 includes contents on a change of a user interface state or a condition in which a user interface state is changed.

The codec module 115 includes a software component related to encoding and decoding of a video file.

The application module 116 includes a software component of at least one application installed in the electronic device 100. Such an application can include a browser, an email, a phonebook, a game, an SMS, a Multimedia Message Service (MMS), a Social Network Service (SNS), an instant message, a wake-up call, an MP3 player, a scheduler, a drawing board, a camera, word processing, keyboard emulation, a music player, a moving picture player, an address book, a contact list, a widget, Digital Rights Management (DRM), speech recognition, voice duplication, a location determination function, a location based service, and a user authentication service. A term of an application can be represented with an application program.

The reaction moving picture operation module 117 includes various software components that photograph a second moving picture while reproducing a first moving picture. The second moving picture includes a reaction moving picture representing a reaction to the first moving picture of a user of the electronic device 100. The reaction moving picture operation module 117 stores time information and location information about a reaction moving picture and determines a user face look included in a reaction moving picture.

The processor unit 120 can further include an additional module (such as instructions) in addition to the foregoing module.

Various functions of the electronic device 100 can be executed by hardware or software including at least one processing or Application Specific Integrated Circuit (ASIC).

The electronic device 100 includes a power system that supplies power to several constituent elements therein. The power system can include a power source (AC power source or battery), a power error detection circuit, a power converter, a power inverter, a charge device, or a power state display device (such as a light emitting diode). Further, the electronic device 100 includes a power management and control device that performs a function of generating, managing, and distributing power.

As disclosure herein, constituent elements of the electronic device 100 are illustrated, but the present disclosure is not limited thereto. For example, the electronic device 100 can have constituent elements of the number more than or fewer than those shown in the drawings.

Figure 4:
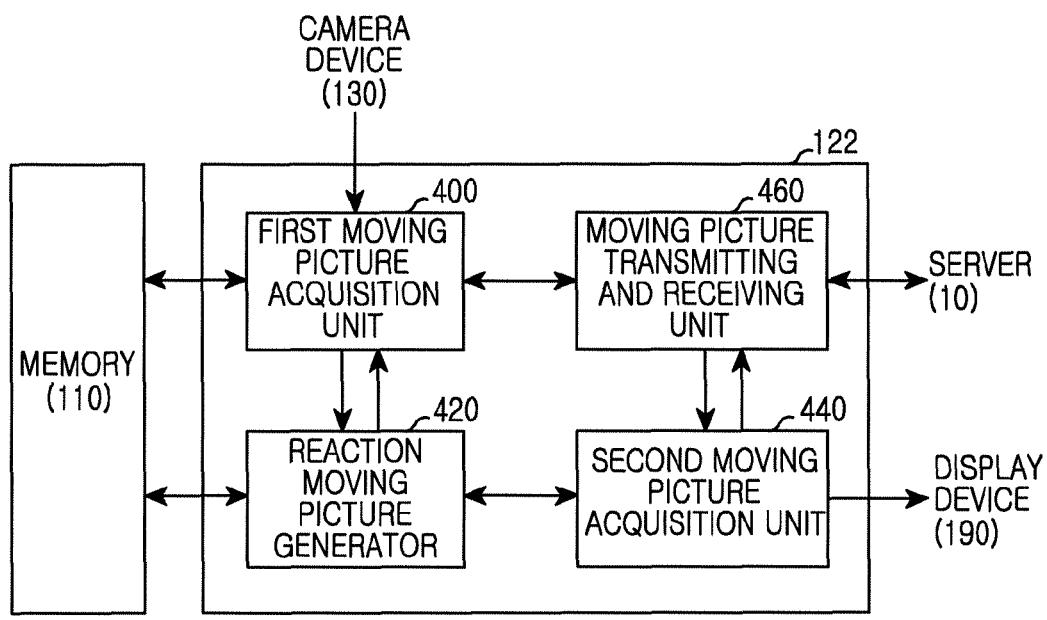
FIG. 4 is a block diagram illustrating an example configuration of a processor according to this disclosure.

FIG. 4 is a block diagram illustrating an example configuration of a processor 122 according to this disclosure.

Referring to FIG. 4, the processor 122 includes a first moving picture acquisition unit 400, a reaction moving picture generator 420, a second moving picture acquisition unit 440, and a moving picture transmitting and receiving unit 460.

Constituent elements of the processor 122 can be formed with separate modules, but in other exemplary embodiments, constituent elements of the processor 122 can be included in constituent elements of software within a module.

The first moving picture acquisition unit 400 generates a first moving picture using image information received through the camera device 130. Further, the first moving picture acquisition unit 400 receives a first moving picture from the server 10 through the moving picture transmitting and receiving unit 460.

The first moving picture acquisition unit 400 receives a specific signal while generating the first moving picture. Such a specific signal can include time information and location information in which the first moving picture is captured, but it is not limited thereto. The first moving picture acquisition unit 400 stores the first moving picture together with a specific signal at the memory 110.

The reaction moving picture generator 420 generates at least one reaction moving picture representing a reaction to the first moving picture of a user of the electronic device 100 while reproducing the first moving picture acquired in the first moving picture acquisition unit 400. For example, the reaction moving picture generator 420 photographs a user face image according to a recording segment of a reaction moving picture using the camera device 130 installed at a front surface of the electronic device 100.

The second moving picture acquisition unit 440 edits a reaction moving picture received from the reaction moving picture generator 420 and generates a second moving picture coupled to the first moving picture. Further, the second moving picture acquisition unit 440 receives a second moving picture from the server 10 through the moving picture transmitting and receiving unit 460.

The second moving picture acquisition unit 440 provides a second moving picture acquired with the foregoing method to the input/output controller 180. The input/output controller 180 controls the display device 190 to display the received second moving picture.

The moving picture transmitting and receiving unit 460 receives a first moving picture, a second moving picture, and a reaction moving picture from the server 10. Further, the moving picture transmitting and receiving unit 460 transmits the first moving picture, the second moving picture, and the reaction moving picture generated in the electronic device 100 to the server 10.

Constituent elements of the processor 122 are illustrated, but the present disclosure is not limited thereto. For example, the processor 122 can have constituent elements of the number more than or fewer than those shown in the drawings.

Figure 5:
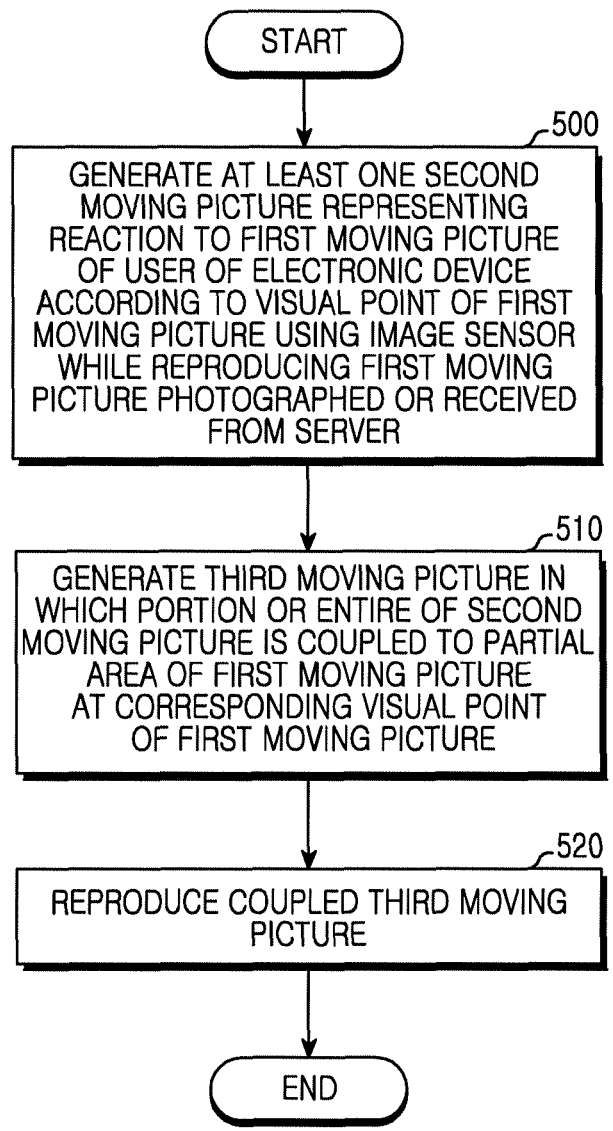
FIG. 5 is a flowchart illustrating an example method of operating an electronic device according to this disclosure.

FIG. 5 is a flowchart illustrating an example method of operating an electronic device 100 according to this disclosure.

Referring to FIG. 5, in operation 500, the electronic device 100 generates at least one second moving picture representing a reaction to the first moving picture of a user of the electronic device 100 according to a visual point of the first moving picture using an image sensor while reproducing the first moving picture captured or received from the server 10. Here, the server 10 includes a cloud server of a cloud service method connected to the electronic device 100 by the network 30 to provide various contents or a streaming server that provides a media file, but the server 10 is not limited thereto.

Figure 10:
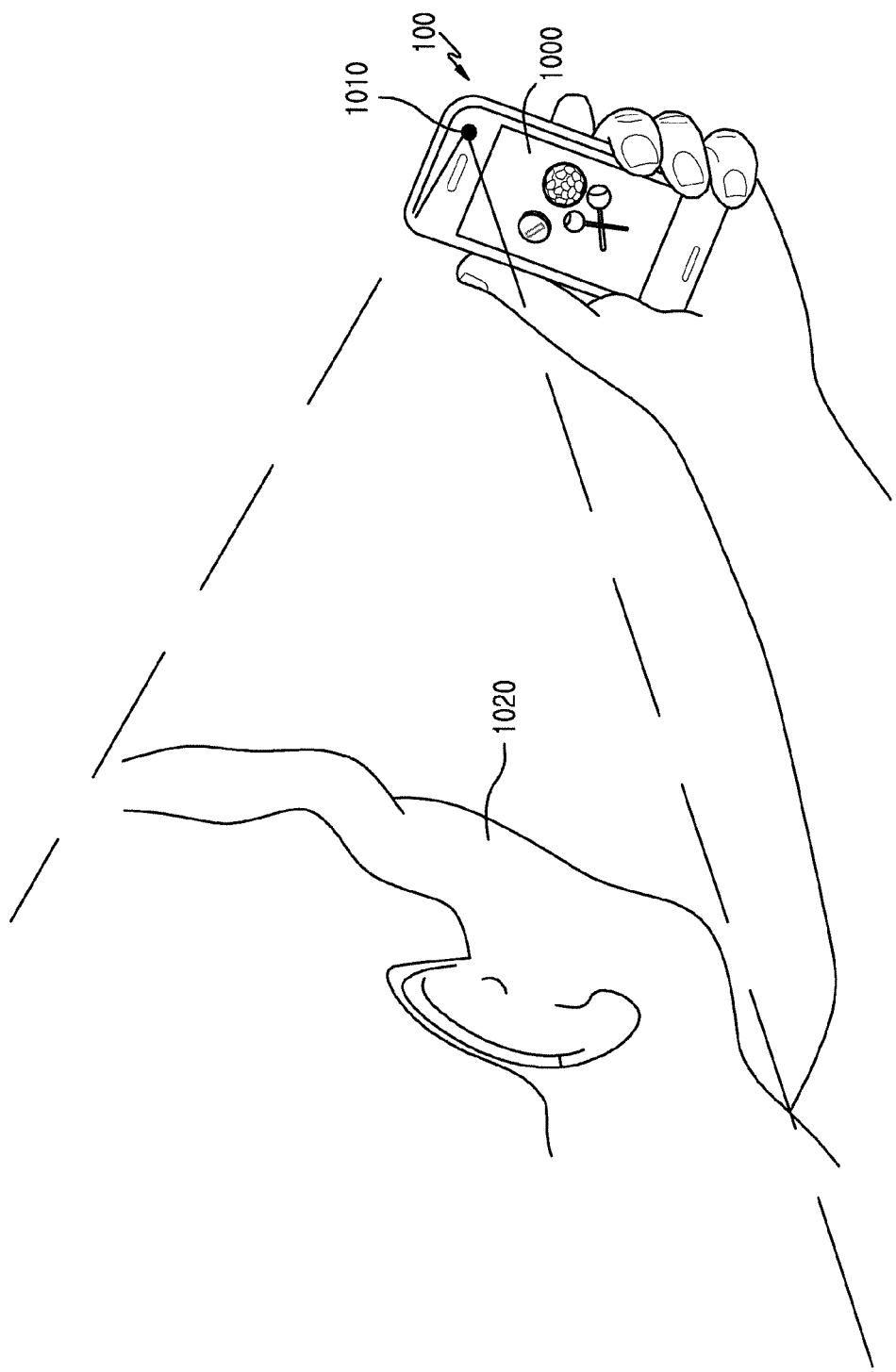
FIG. 10 is a diagram illustrating an example method of capturing a reaction moving picture according to this disclosure.

According to an exemplary embodiment, the electronic device 100 reproduces the first moving picture received from the server 10 or reproduces the first moving picture captured in the electronic device 100. Further, the electronic device 100 photographs a face image 1020 of a user using an image sensor 1010 of the electronic device 100 while reproducing a first moving picture 1000, as shown in FIG. 10.

A second moving picture including such a face image 1020 is captured according to a visual point of the first moving picture 1000, and a capturing segment of the second moving picture is previously set by a user.

FIGS. 11 to 17 are diagrams illustrating an example method of setting a capturing segment of a reaction moving picture according to this disclosure.

Figure 11:
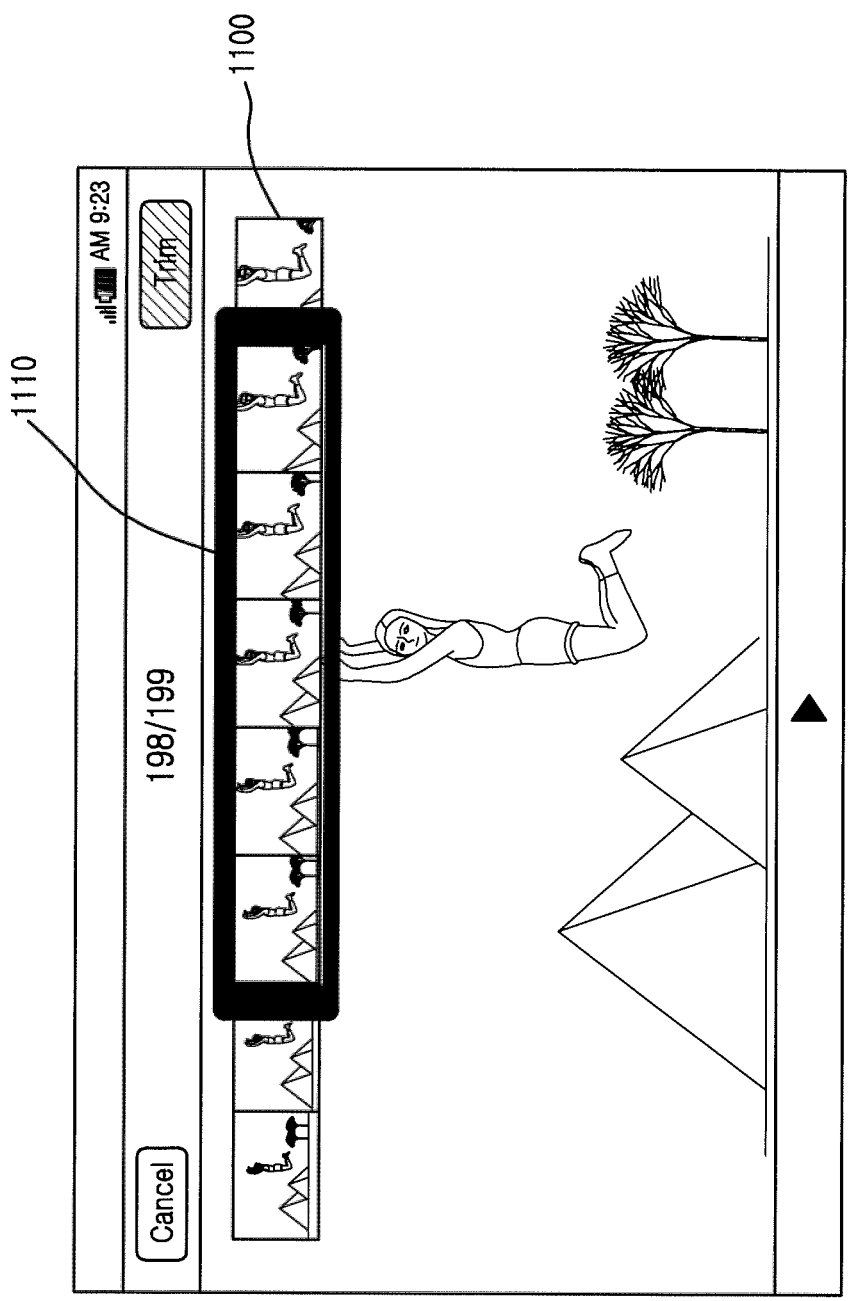
FIGS. 11 to 17 are diagrams illustrating example methods of setting a capturing segment of a reaction moving picture according to this disclosure.

As shown in FIG. 11, the electronic device (such as electronic device 100) determines a second moving picture capturing segment 1110 at an entire segment 1100 of the first moving picture with an existing media file editing method. Such a capturing segment 1110 of the second moving picture can be at least one and setting information of the capturing segment 1110 is stored at attribute information of the second moving picture file.

The capturing segment of the second moving picture is previously set in the server 10. In such a case, the electronic device 100 displays a capturing segment of the second moving picture on a first moving picture screen.

Figure 12:
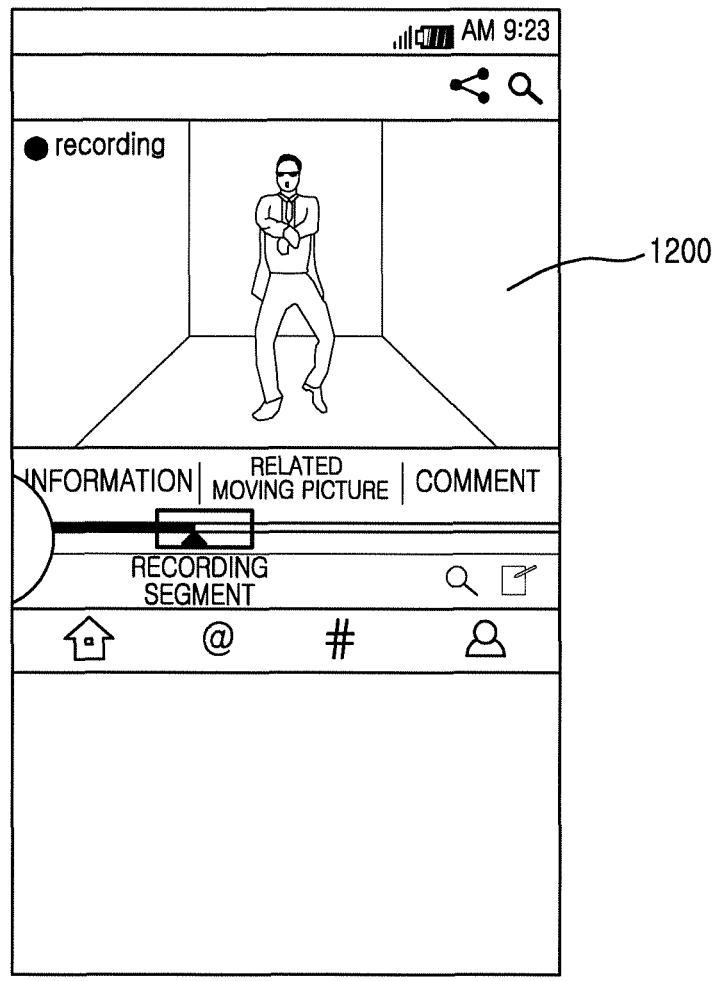

As shown in FIG. 12, while a first moving picture 1200 is reproduced, a recording segment of the second moving picture is displayed together with a reproduction scroll bar. Further, a guide phrase or a voice notifying recording of the second moving picture is further output. However, the present disclosure is not limited thereto and a recording segment of the second moving picture can be displayed with various methods, and various methods notifying recording of the second moving picture exist.

In operation 510, the electronic device 100 generates a third moving picture in which a portion or the entire of the second moving picture is coupled to a partial area of the first moving picture at a corresponding visual point of the first moving picture.

As described above, the electronic device 100 edits a second moving picture captured at a recording segment of the second moving picture and couple the edited second moving picture to a partial area of the first moving picture with an overlay method. However, the present disclosure is not limited thereto and a portion of the second moving picture can be coupled to a partial area of the first moving picture through various methods.

In operation 520, the electronic device 100 reproduces the coupled third moving picture.

Figure 13:
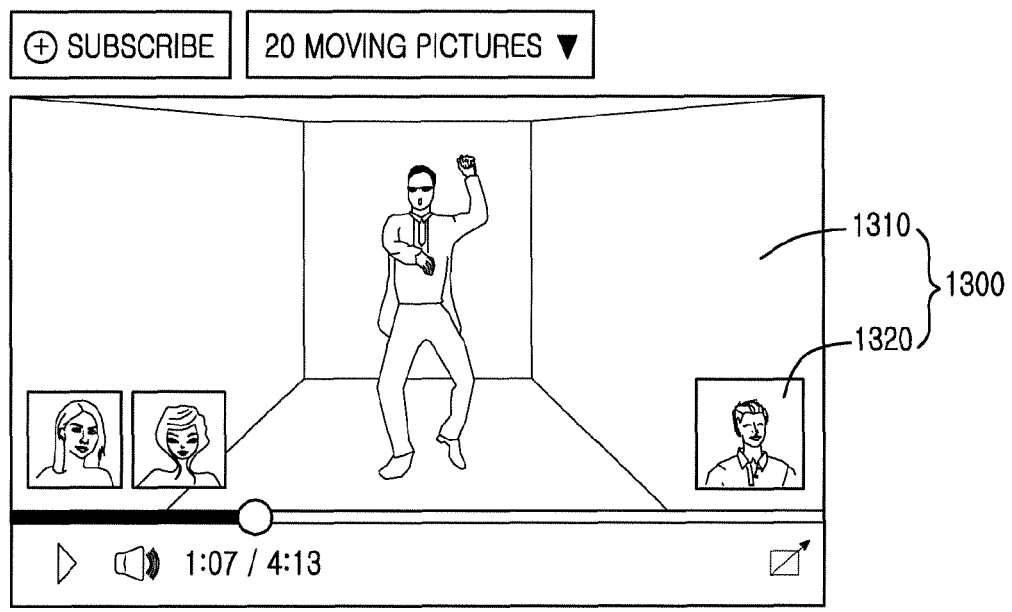

As shown in FIG. 13, a third moving picture 1300 in which a first moving picture 1310 and a second moving picture 1320 are coupled is displayed on a screen of the electronic device (such as electronic device 100). The second moving picture 1320 may be displayed with an overlay method in a partial area of the first moving picture 1310, and a size and a location of the second moving picture 1320 may be set by a user.

Figure 14:
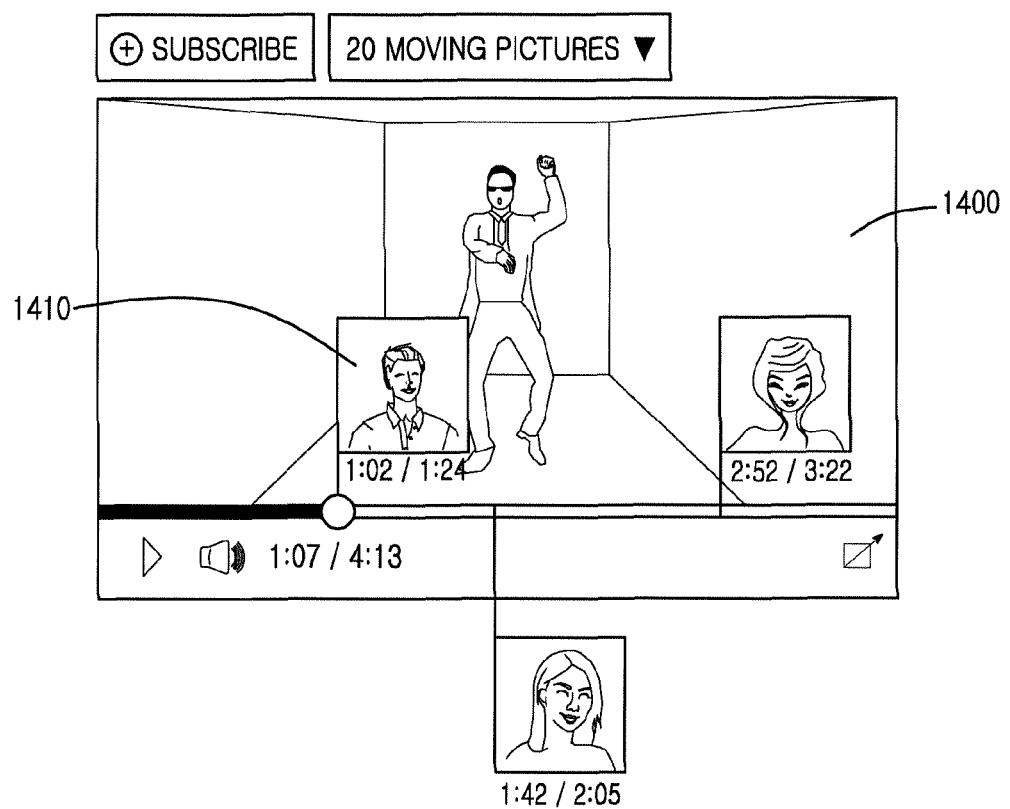

As shown in FIG. 14, while a first moving picture 1400 is reproduced, the electronic device (such as electronic device 100) notifies a reproduction time of a second moving picture 1410. For example, a reproduction time of the second moving picture 1410 is displayed in a reproduction scroll bar, but it is not limited thereto. The electronic device 100 synchronizes a reproduction time of the second moving picture 1410 and the first moving picture 1400 and displays the second moving picture 1410 in a predetermined area of the first moving picture 1400.

An instruction set of such each operation is stored in at least one module at the memory 110. In this case, the module stored at the memory 110 is executed by at least one processor 122.

Figure 6:
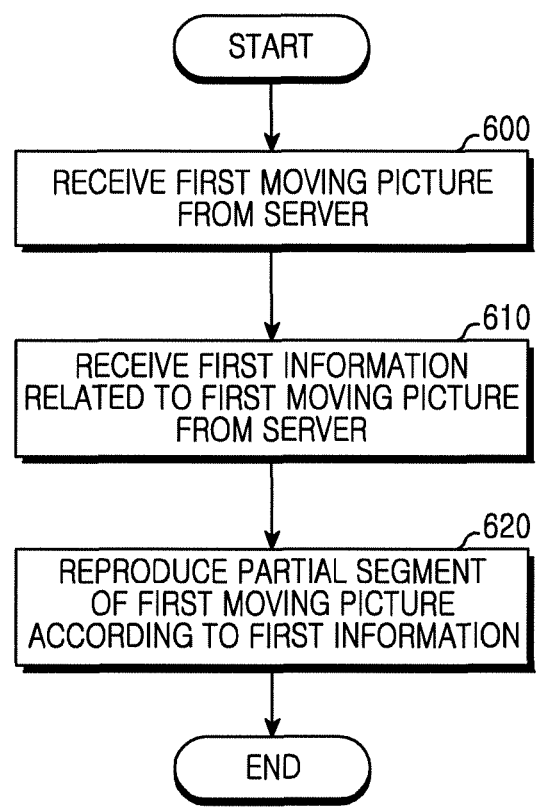
FIG. 6 is a flowchart illustrating an example method of operating an electronic device according to this disclosure.

FIG. 6 is a flowchart illustrating an example method of operating an electronic device 100 according to this disclosure.

Referring to FIG. 6, in operation 600, the electronic device 100 receives a first moving picture from the server 10. Here, the server 10 includes a cloud server of a cloud service method connected to the electronic device 100 by the network 30 to provide various contents or a streaming server that provides a media file, but the server 10 is not limited thereto.

In operation 610, the electronic device 100 receives first information related to the first moving picture from the server 10.

Figure 15A:
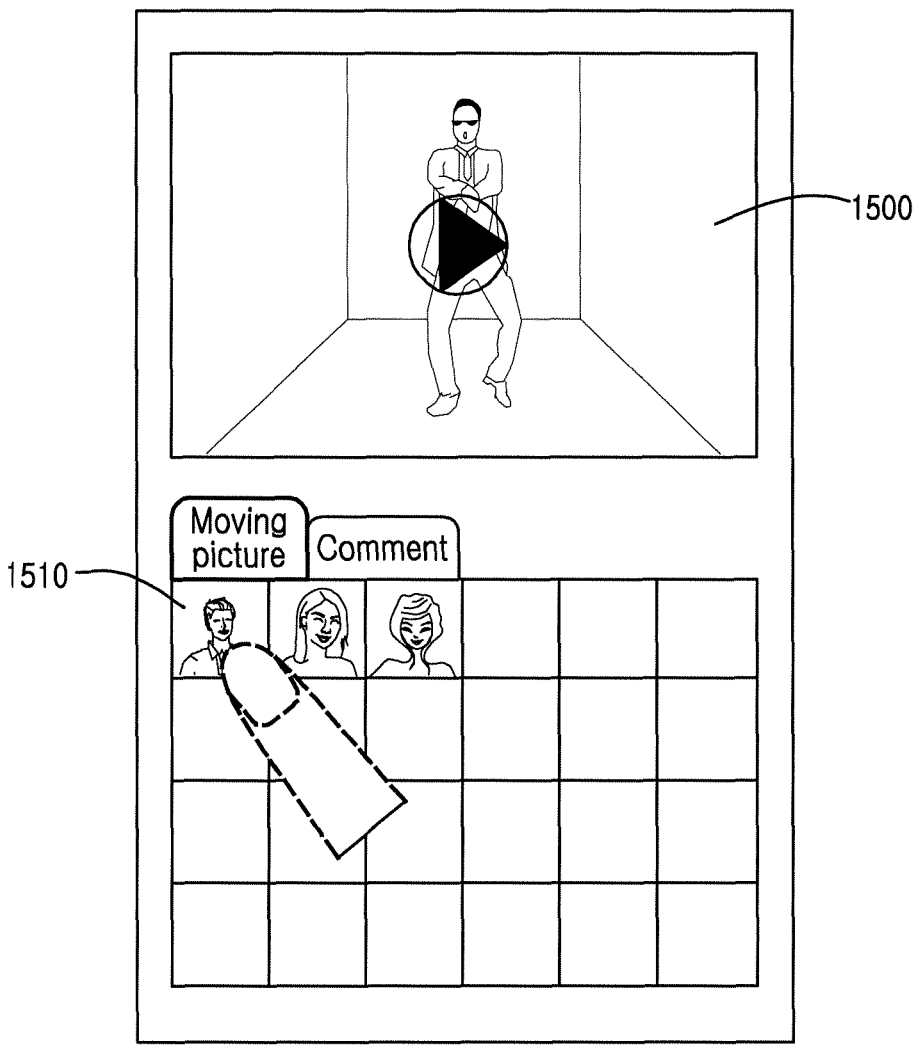

The first information includes a reaction moving picture representing a reaction to the first moving picture of a user of the electronic device 100. Such first information is displayed in a lower portion of s first moving picture 1500, as shown in FIG. 15A. For example, first information 1510 is displayed in a comment form or a layout form, but a display form of the first information 1510 is not limited thereto. The first information 1510 can be provided from another electronic device through the server 10 and can be provided within the server 10.

In operation 620, the electronic device 100 reproduces a partial segment of the first moving picture according to the first information.

Figure 15B:
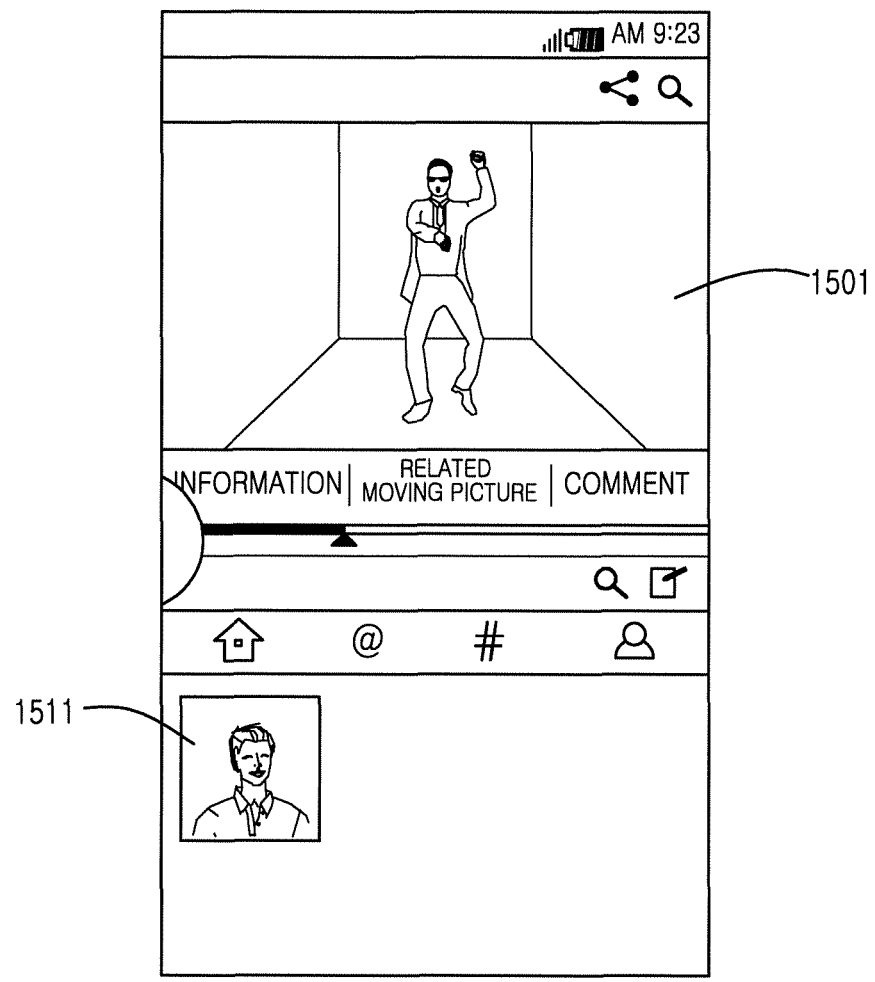

When the first information 1510 is selected, the electronic device (such as electronic device 100) reproduces a partial segment of the first moving picture 1501 corresponding to the selected first information 1511, as shown in FIG. 15B. In such a case, a partial segment of the first moving picture 1501 is reproduced together with execution of the first information 1511, and the first information 1511 is displayed with an overlay method in a partial area of the first moving picture 1501.

Therefore, the electronic device 100 reproduces a specific reproduction segment such as a highlight segment of the first moving picture 1501 using the first information 1511 related to the first moving picture 1501.

An instruction set of each operation can be stored in at least one module at the memory 110. In this case, the module stored at the memory 110 is executed by at least one processor 122.

Figure 7:
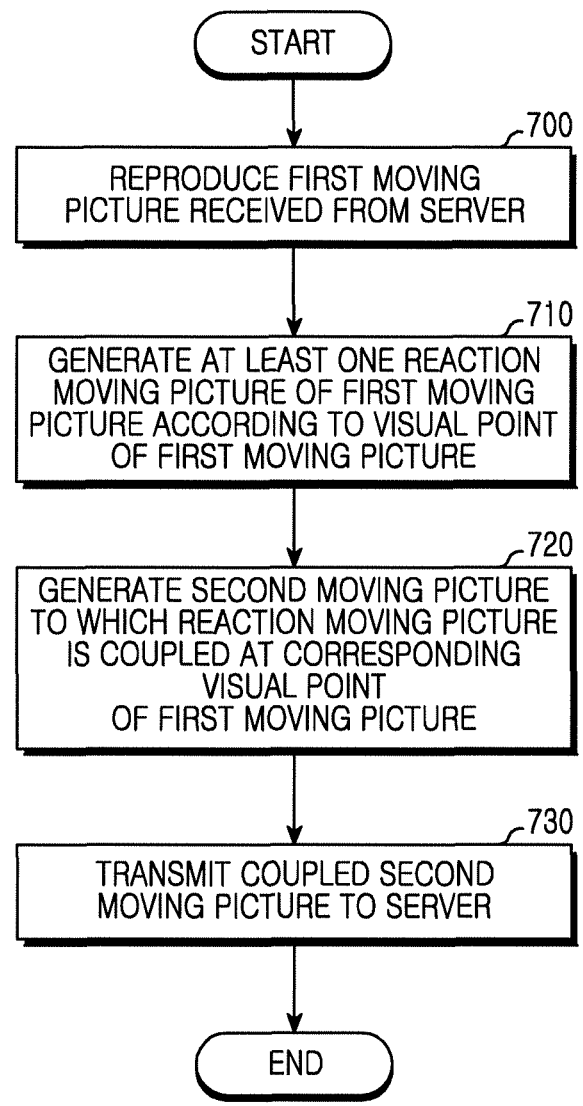
FIG. 7 is a flowchart illustrating an example method of operating an electronic device according to this disclosure.

FIG. 7 is a flowchart illustrating a method of operating an electronic device 100 according to another exemplary embodiment of the present disclosure.

Referring to FIG. 7, in operation 700, the electronic device 100 reproduces a first moving picture received from the server 10. Here, the server 10 includes a cloud server of a cloud service method connected to the electronic device 100 by the network 30 to provide various contents or a streaming server that provides a media file, but the server 10 is not limited thereto.

In operation 710, the electronic device 100 generates at least one reaction moving picture of the first moving picture according to a visual point of the first moving picture.

The electronic device 100 photographs a reaction moving picture representing a user reaction through the camera device 130. A capturing segment of such a reaction moving picture can be set by a user, but the present disclosure is not limited thereto.

In operation 720, the electronic device 100 generates a second moving picture to which the reaction moving picture is coupled at a corresponding visual point of the first moving picture.

The electronic device 100 edits a reaction moving picture captured at a capturing segment of reaction moving picture and couples the edited reaction moving picture to a partial area of the first moving picture with an overlay method. However, a coupling method is not limited thereto and a portion of the reaction moving picture can be coupled to a partial area of the first moving picture through various methods.

In operation 730, the electronic device 100 transmits the coupled second moving picture to the server 10.

The electronic device 100 can upload the second moving picture to the server 10 through the network 30. The server 10 provides the received second moving picture to the second electronic device 20.

An instruction set of each operation can be stored in at least one module at the memory 110. In this case, the module stored at the memory 110 is executed by at least one processor 122.

Figure 8:
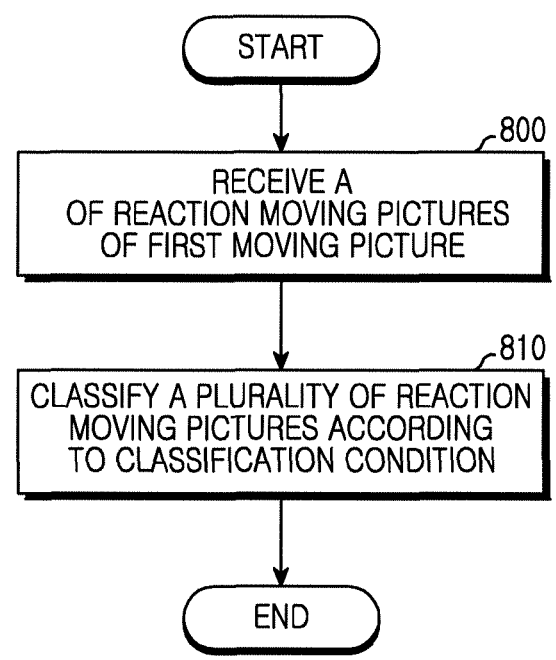
FIG. 8 is a flowchart illustrating an example method of operating an electronic device according to this disclosure.

FIG. 8 is a flowchart illustrating an example method of operating an electronic device 100 according to this disclosure.

Referring to FIG. 8, in operation 800, the electronic device 100 receives a plurality of reaction moving pictures of the first moving picture.

The electronic device 100 receives a plurality of reaction moving pictures to the first moving picture through the server 10 and displays the plurality of reaction moving pictures on a screen. Here, the reaction moving picture is a moving picture representing a viewer reaction to the first moving picture. The server 10 includes a cloud server of a cloud service method connected to the electronic device 100 by the network 30 to provide various contents or a streaming server that provides a media file, but the server 10 is not limited thereto.

In operation 810, the electronic device 100 classifies a plurality of reaction moving pictures according to a classification condition.

The electronic device 100 classifies a reaction moving picture according to a face look (such as a laughing look, a crying look, or a surprised look) in the reaction moving picture or the recommendation number. Further, the electronic device 100 adjusts the number of reaction moving pictures displayed on a screen or sets a location thereof. However, the present disclosure is not limited thereto and the electronic device 100 can classify a reaction moving picture according to various classification conditions.

An instruction set of each operation can be stored in at least one module at the memory 110. In this case, the module stored at the memory 110 is executed by at least one processor 122.

Figure 9:
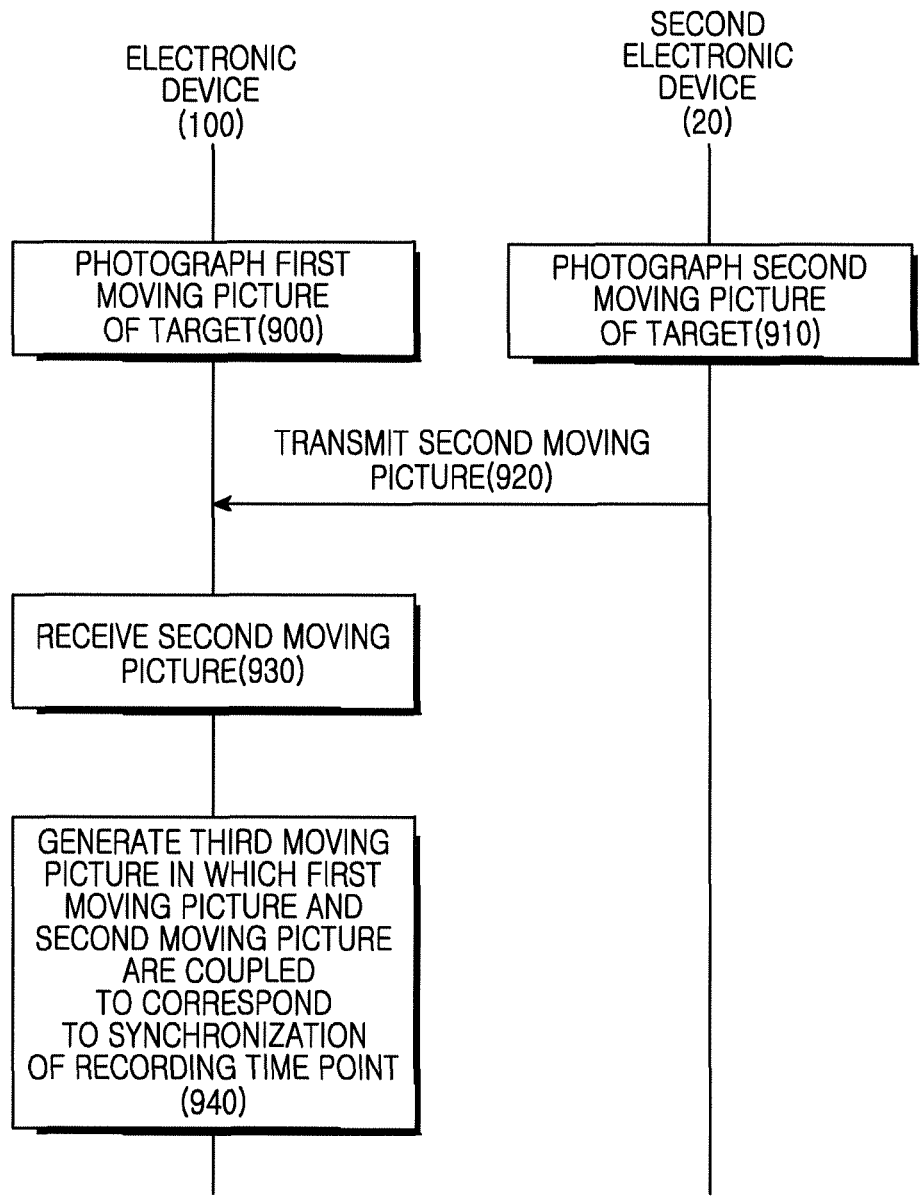
FIG. 9 is a flowchart illustrating an example method of operating an electronic device and a second electronic device according to this disclosure.

FIG. 9 is a flowchart illustrating an example method of operating an electronic device 100 and a second electronic device 20 according to this disclosure.

Figure 16A:
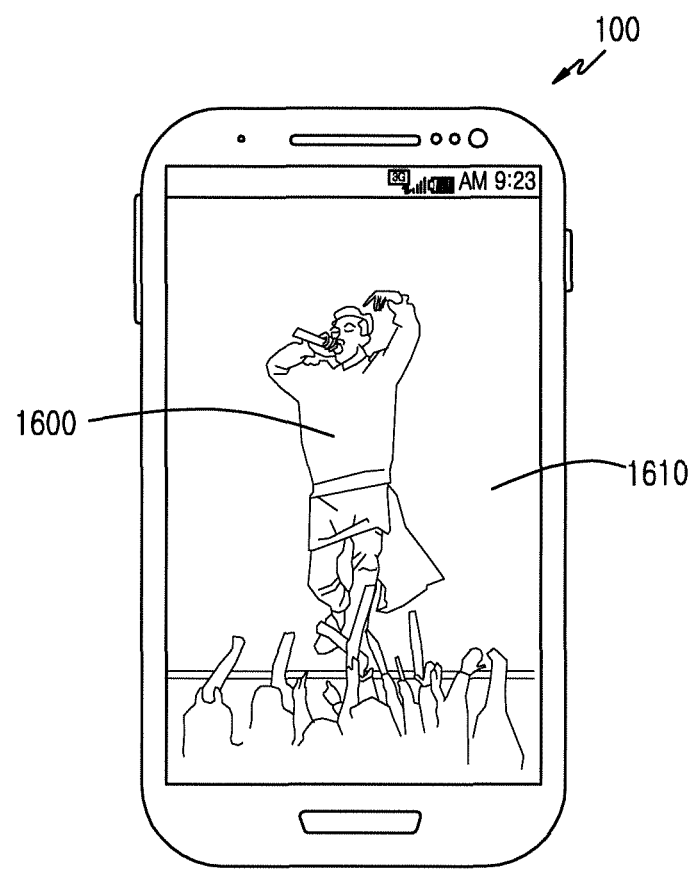
Figure 16B:
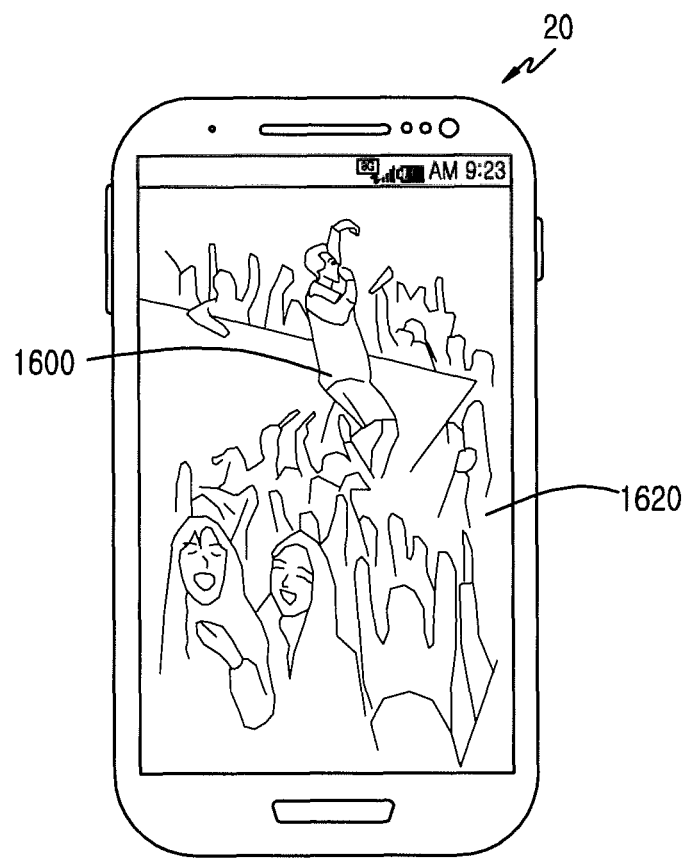

Referring to FIG. 9, in operation 900, the electronic device 100 photographs a first moving picture of a target. For example, as shown in FIG. 16A, the electronic device 100 photographs a first moving picture 1610 of a person 1600 at a specific location such as a concert hall. In operation 910, the second electronic device 20 photographs a second moving picture 1620 that captures the same person 1600 with different angles, as shown in FIG. 16B.

A case of capturing the second moving picture 1620 after the first moving picture 1610 is captured is illustrated, but the present disclosure is not limited thereto. For example, the first moving picture 1610 and the second moving picture 1620 can be simultaneously captured.

The electronic device 100 and the second electronic device 20 receives a specific signal while capturing the first moving picture 1610 and the second moving picture 1620. Such a specific signal can be a supersonic wave signal or an infrared ray signal including time information and location information, but it is not limited thereto. The electronic device 100 and the second electronic device 20 can store corresponding moving pictures 1610 and 1620 together with the foregoing specific signal.

In operation 920, the second electronic device 20 transmits the captured second moving picture to the electronic device 100. In operation 930, the electronic device 100 receives the second moving picture and in operation 940, the electronic device 100 generates a third moving picture in which the first moving picture and the second moving picture are coupled to correspond to synchronization of a recording time point.

The electronic device 100 determines a capturing time of the first moving picture and the second moving picture and synchronizes the first moving picture and the second moving picture. Further, the electronic device 100 synchronizes the first moving picture and the second moving picture using a specific signal received when the first moving picture and the second moving picture are captured. However, a synchronizing method is not limited thereto and various methods of synchronizing the first moving picture and the second moving picture exist.

Figure 17:
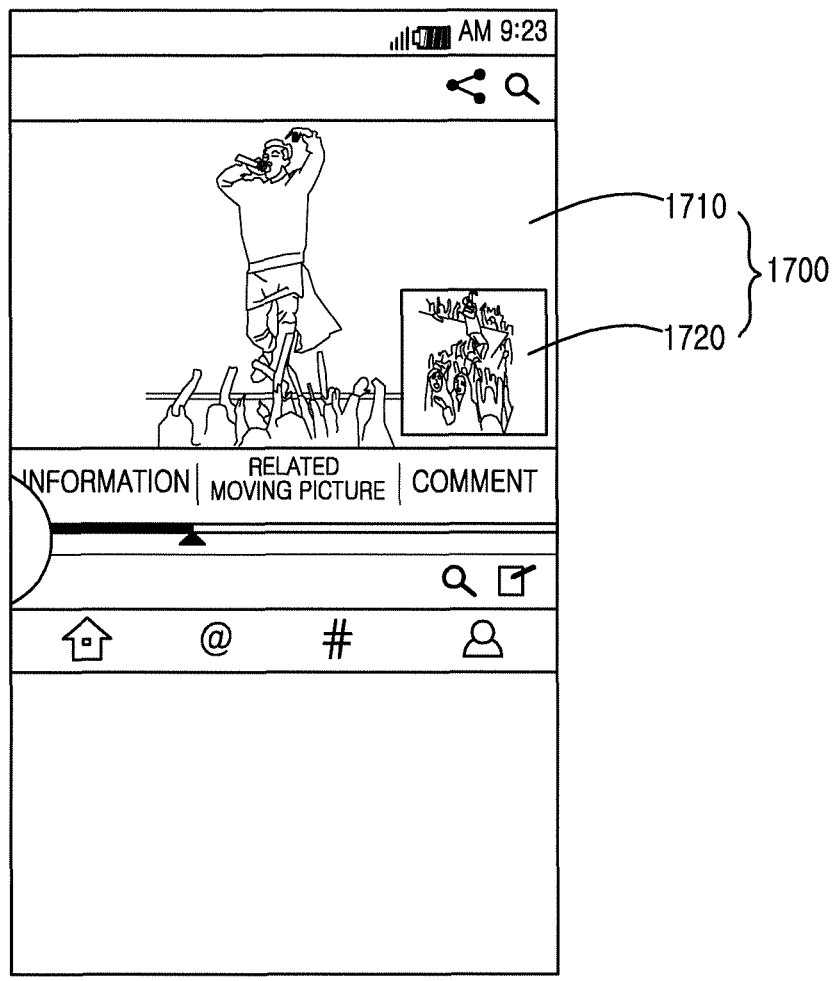

As shown in FIG. 17, a second moving picture 1720 is displayed with an overlay method in a predetermined area of a first moving picture 1710.

A third moving picture 1700 in which the second moving picture 1720 and the first moving picture 1710 are coupled is displayed on one screen of the electronic device 100. Further, when the third moving picture 1700 is reproduced, the first moving picture 1710 included in the third moving picture 1700 is displayed on a screen of the electronic device 100, and the second moving picture 1720 is displayed in another electronic device.

The electronic device 100 searches for the second moving picture 1720 using a specific signal included in the first moving picture 1710. For example, because a specific signal included in the first moving picture 1710 have time information and location information when capturing a corresponding moving picture, the electronic device 100 compares the specific signal included in the first moving picture 1710 with a specific signal of the second moving picture 1720 and searches for the second moving picture 1720.

An instruction set of each operation can be stored in at least one module at the memory 110. In this case, the module stored at the memory 110 is executed by at least one processor 122.

Methods according to exemplary embodiment described in claims and/or a specification of the present disclosure can be implemented in a form of hardware, software, or a combination of hardware and software.

When implemented with software, a computer readable storage medium that stores at least one program (software module) can be provided. At least one program stored at the computer readable storage medium can be executed by at least one processor within the electronic device. At least one program can include an instruction that enables the electronic device to execute methods according to exemplary embodiment described in claims and/or a specification of the present disclosure.

Such a program (software module, software) can be stored at a Random Access Memory (RAM), a non-volatile memory including a flash memory, a Read-Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette. Alternatively, the program may be stored at a memory formed with a combination of a portion or the entire thereof. Further, each constituent memory can be included in plural.

The program can be stored at an attachable storage device that may access to the electronic device through a communication network such as Internet, Intranet, a LAN, a Wireless LAN (WLAN), or a Storage Area Network (SAN) or a communication network formed with a combination thereof. Such a storage device may access to the electronic device through an external port device.

Further, a separate storage device on the communication network can access to a portable electronic device.

An electronic device can provide a streaming service, search for a moving picture having a correlation, and provide a user interface that can intuitionally share a user reaction to contents.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method of operating an electronic device, the method comprising:
    generating, using a processor of the electronic device, at least one second moving picture representing a reaction to a first moving picture of a user of the electronic device based on a visual point of the first moving picture while playing the first moving picture captured or received from a server;
    synchronizing, using the processor, a reproduction time of the second moving picture and the first moving picture; and displaying, using the processor, the second moving picture in a predetermined area of the first moving picture.

2. The method of claim 1, wherein the visual point of the first moving picture is previously set.

3. The method of claim 1, wherein the visual point of the first moving picture is determined by the user.

4. The method of claim 1, further comprising displaying, using the processor, the second moving picture based on a user input.

5. The method of claim 1, further comprising:
generating, using the processor, a third moving picture in which at least a portion of the second moving picture is coupled to a partial area of the first moving picture at a corresponding visual point of the first moving pictures; and
transmitting, using the processor, the third moving picture to the server.

6. The method of claim 5, wherein the third moving picture is played in an external electronic device through the server.

7. A method of operating an electronic device, the method comprising:
receiving, using a processor of the electronic device, a first moving picture from a server;
receiving, using the processor, a moving picture information related to the first moving picture from the server;
playing, using the processor, at least a partial segment of the first moving picture based on the moving picture information;
synchronizing, using the processor, a reproduction time of the first moving picture and a second moving picture; and
displaying, using the processor, the second moving picture in a predetermined area of the first moving picture.

8. The method of claim 7, wherein the moving picture information comprises a reaction moving picture representing a reaction of a user of an external electronic device that receives the first moving picture from the server.

9. The method of claim 8, wherein the reaction moving picture is displayed with an overlay method in a partial area of the first moving picture.

10. The method of claim 8, wherein the partial segment of the moving picture is displayed on a screen of the electronic device and the reaction moving picture corresponding to the moving picture information is displayed on a screen of an external electronic device.

11. The method of claim 7, wherein the moving picture information is classified and displayed based on a reference condition.

12. A method of operating an electronic device, the method comprising:
capturing, using a processor of the electronic device, a first moving picture of a target;
receiving, by an external electronic device and using the processor, a second moving picture that captures the target from the external electronic device;
synchronizing, using the processor, a reproduction time of the second moving picture and the first moving picture; and displaying, using the processor, the second moving picture in a predetermined area of the first moving picture.

13. The method of claim 12, further comprising capturing, using the processor, the first moving picture of the target and receiving a specific signal.

14. The method of claim 13, further comprising searching, using the processor, for the second moving picture comprising the specific signal.

15. An electronic device, comprising:
at least one image sensor;
a memory; and
at least one processor configured to:
generate at least one second moving picture representing a reaction to a first moving picture of a user of the electronic device based on a visual point of the first moving picture using the image sensor while playing the first moving picture captured or received from a server,
synchronize a reproduction time of the second moving picture and the first moving picture;
control to display the second moving picture in a predetermined area of the first moving picture.

16. The electronic device of claim 15, wherein the processor is configured to set the visual point of the first moving picture.

17. The electronic device of claim 15, wherein the processor is configured to control to display the second moving picture based on a user input.

18. The electronic device of claim 15, wherein the processor is configured to transmit the third moving picture to the server.

19. The electronic device of claim 15, wherein the processor is configured to control to display the first moving picture of the third moving picture on a screen of the electronic device and display the second moving picture of the third moving picture on a screen of the external electronic device.

* * * * *